US009784581B2

(12) United States Patent
Donadel et al.

(10) Patent No.: US 9,784,581 B2
(45) Date of Patent: Oct. 10, 2017

(54) MICROELECTROMECHANICAL GYROSCOPE WITH COMPENSATION OF QUADRATURE SIGNAL COMPONENTS

(71) Applicant: STMicroelectronics S.r.l., Agrate Brianza (IT)

(72) Inventors: Andrea Donadel, Meda (IT); Davide Magnoni, Varese (IT); Marco Garbarino, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 307 days.

(21) Appl. No.: 14/151,426

(22) Filed: Jan. 9, 2014

(65) Prior Publication Data

US 2014/0190258 A1    Jul. 10, 2014

(30) Foreign Application Priority Data

Jan. 9, 2013   (IT) ............................. TO2013A0013

(51) Int. Cl.
*G01C 19/5776*   (2012.01)
*G01C 19/5726*   (2012.01)

(52) U.S. Cl.
CPC ..... *G01C 19/5776* (2013.01); *G01C 19/5726* (2013.01)

(58) Field of Classification Search
CPC ............ G01C 19/5726; G01C 19/5776; G01C 19/5755; G01C 19/5762; G01C 19/5733
USPC .............. 73/504.02, 504.04, 504.12–504.16; 324/76.78–76.79
See application file for complete search history.

(56) References Cited

U.S. PATENT DOCUMENTS

| 5,481,914 A | * | 1/1996 | Ward ...................... H03F 1/083 |
| | | | 73/504.16 |
| 6,250,156 B1 | * | 6/2001 | Seshia ................ G01C 19/5719 |
| | | | 73/504.12 |
| 7,305,880 B2 | | 12/2007 | Caminada et al. |
| 2003/0101814 A1 | * | 6/2003 | Challoner .......... G01C 19/5719 |
| | | | 73/504.12 |
| 2006/0162448 A1 | * | 7/2006 | Durante ............. G01C 19/5762 |
| | | | 73/504.13 |
| 2007/0180908 A1 | | 8/2007 | Seeger et al. |
| 2008/0000296 A1 | * | 1/2008 | Johnson ............. G01C 19/5719 |
| | | | 73/514.18 |
| 2009/0031805 A1 | * | 2/2009 | Mayer-Wegelin . G01C 19/5649 |
| | | | 73/504.12 |

(Continued)

*Primary Examiner* — Peter MacChiarolo
*Assistant Examiner* — David L Singer
(74) *Attorney, Agent, or Firm* — Seed Intellectual Property Law Group LLP

(57) ABSTRACT

A gyroscope includes: a mass, which is movable with respect to a supporting body; a driving loop for keeping the mass in oscillation according to a driving axis; a reading device, which supplying an output signal indicating an angular speed of the body; and a compensation device, for attenuating spurious signal components in quadrature with respect to a velocity of oscillation of the mass. The reading device includes an amplifier, which supplies a transduction signal indicating a position of the mass according to a sensing axis. The compensation device forms a control loop with the amplifier, extracts from the transduction signal an error signal representing quadrature components in the transduction signal, and supplies to the amplifier a compensation signal such as to attenuate the error signal.

20 Claims, 3 Drawing Sheets

(56) References Cited

U.S. PATENT DOCUMENTS

| | | | |
|---|---|---|---|
| 2009/0241662 A1* | 10/2009 | Supino | G01C 19/5719 |
| | | | 73/504.12 |
| 2010/0000289 A1* | 1/2010 | Prandi | G01C 19/5762 |
| | | | 73/1.37 |
| 2010/0263445 A1* | 10/2010 | Hayner | G01C 19/56 |
| | | | 73/504.12 |
| 2010/0307243 A1* | 12/2010 | Prandi | G01C 19/5726 |
| | | | 73/504.12 |
| 2011/0197675 A1* | 8/2011 | Caminada | G01C 19/5762 |
| | | | 73/504.12 |
| 2012/0186345 A1 | 7/2012 | Bauer et al. | |
| 2014/0132186 A1* | 5/2014 | Tazartes | G01H 3/00 |
| | | | 318/128 |
| 2014/0300425 A1* | 10/2014 | Cazzaniga | G01C 19/5776 |
| | | | 331/154 |

\* cited by examiner

_MICROELECTROMECHANICAL GYROSCOPE WITH COMPENSATION OF QUADRATURE SIGNAL COMPONENTS_

BACKGROUND

Technical Field

The present disclosure relates to a microelectromechanical gyroscope with compensation of quadrature signal components and to a method for controlling a microelectromechanical gyroscope.

Description of the Related Art

As is known, the use of microelectromechanical systems (MEMS) is increasingly widespread in various sectors of technology and has yielded encouraging results especially in the production of inertial sensors, microintegrated gyroscopes, and electromechanical oscillators for a wide range of applications.

MEMS of this type are usually based upon microelectromechanical structures comprising at least one mass connected to a supporting body (also referred to as "stator") by springs and movable with respect to the stator according to pre-set degrees of freedom. The movable mass and the stator are capacitively coupled by a plurality of respective electrodes facing one another so as to form capacitors. The movement of the movable mass with respect to the stator, for example on account of an external stress, modifies the capacitance of the capacitors, so it is possible to trace back to the relative displacement of the movable mass with respect to the supporting body and hence to the force applied. Conversely, by supplying appropriate bias voltages, it is possible to apply an electrostatic force to the movable mass to set it in motion. Moreover, to obtain electromechanical oscillators the frequency response of the inertial MEMS structures is exploited, which typically is of the second-order low-pass type, with a resonance frequency.

MEMS gyroscopes, in particular, present a more complex electromechanical structure, which comprises two masses that are movable with respect to the stator and coupled together so as to have one translational or rotational relative degree of freedom. The two movable masses are both capacitively coupled to the stator. One of the masses is dedicated to driving and is kept in oscillation with controlled amplitude at the resonance frequency. The other mass is driven in oscillatory motion and, in the case of rotation of the microstructure with respect to a pre-set sensing axis with an angular speed, is subjected to a Coriolis force proportional to the angular speed itself. In practice, the driven mass operates as an accelerometer that makes it possible to detect the Coriolis force and acceleration and hence to trace back to the angular speed.

To operate properly, a MEMS gyroscope requires, in addition to the microstructure, a driving device, which has the task of keeping the movable mass in oscillation at the resonance frequency and with controlled amplitude, and a device for reading the displacements of the driven mass, in accordance with the degree of freedom of the driving mass. These displacements, in fact, indicate the Coriolis force and, consequently, the angular speed and may be detected through electrical reading signals correlated to the variations of the capacitive coupling between the driven mass and the stator. As a result of driving at the resonance frequency, the reading signals, determined by rotation of the gyroscope and correlated to the angular speed, are in the form of dual-sideband-suppressed-carrier (DSB-SC) signals; the carrier is in this case the velocity of oscillation of the driving mass and has a frequency equal to the mechanical resonance frequency.

Displacements of the driven mass is normally read by a charge-to-voltage converter, which supplies a signal proportional to the capacitance present between the driven mass itself and the supporting body. The signal generated by the charge-to-voltage converter is demodulated and filtered for extracting the modulating signal, which represents the angular speed of the supporting body about the sensing axis.

Since, however, the MEMS gyroscope has a complex structure and the electromechanical interactions between the movable masses and the stator are frequently nonlinear, the useful signal components are frequently superimposed on spurious components, which are not significant for measurement of the angular speed. The spurious components may be due to various causes. For example, causes of disturbance that are practically impossible to eliminate are the manufacturing imperfections and the process spread so that the behavior of real devices differs in a merely statistically foreseeable way from the design behavior. A very common defect depends upon the fact that the mass used for driving oscillates in a direction not perfectly coinciding with the degree of freedom envisaged in the design stage. In this case, the driving defect has an effect on the useful signal, introducing an unknown amplitude component at the same frequency of the carrier and phase-shifted by 90° (quadrature disturbance).

On the other hand, the contribution of the components of disturbance in many cases is significant and cannot be simply neglected, without introducing unacceptable distortions.

To solve the above problem, it has been proposed to use compensation signals taken from the driving device. The driving device is in fact coupled to the driving mass so as to form a resonant loop that defines the amplitude and frequency of the carrier. The resonant loop generates signals phase-shifted by 90° with respect to the carrier that are collected and supplied at input to the charge-to-voltage converter through a capacitive coupling. The latter, if appropriately sized, enables injection or subtraction of an amount of charge that varies in a sinusoidal way at the frequency of the carrier with a phase shift of 90° and compensation of the quadrature components of disturbance.

Albeit representing an improvement, the solution described still presents some limitations, especially due to the fact that the sizing of the capacitance for applying the compensation signal at input to the charge-to-voltage converter is difficult. The coupling capacitance determines, in fact, the amount of charge injected or subtracted, and, if it is not properly calibrated, the compensation is not complete. On the other hand, the degree of quadrature disturbance may vary in time, for example as a function of the temperature or on account of ageing, especially of the movable parts of the micromechanical structure. Compensation is hence not stable over time.

BRIEF SUMMARY

The present disclosure is directed to a microelectromechanical gyroscope with compensation of quadrature signal components and a method for controlling a micro electromechanical gyroscope.

According to the present disclosure a microelectromechanical gyroscope with compensation of quadrature signal components and a method for controlling a microelectromechanical gyroscope are provided. One embodiment is directed to a gyroscope that includes a supporting body, a sensing mass, elastically coupled to the supporting body and movable with respect to the supporting body according to a driving axis and a sensing axis, a microelectromechanical driving loop coupled to the sensing mass and operable to maintain the sensing mass in oscillation according to the driving axis at a frequency, a reading device, coupled to the sensing mass and configured to provide an output signal representative of an angular speed of the supporting body, the reading device including a reading amplifier configured to provide a transduction signal representative of a position of the sensing mass according to the sensing axis, and a compensation device configured to reduce spurious signal components in quadrature with respect to a velocity of oscillation of the sensing mass according to the driving axis, the compensation device being configured to form a feedback control loop with the reading amplifier and configured to extract, from the transduction signal, an error signal representative of quadrature components in the transduction signal and configured to provide the reading amplifier with a compensation signal that is a function of the error signal and is configured to reduce the quadrature components in the transduction signal.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
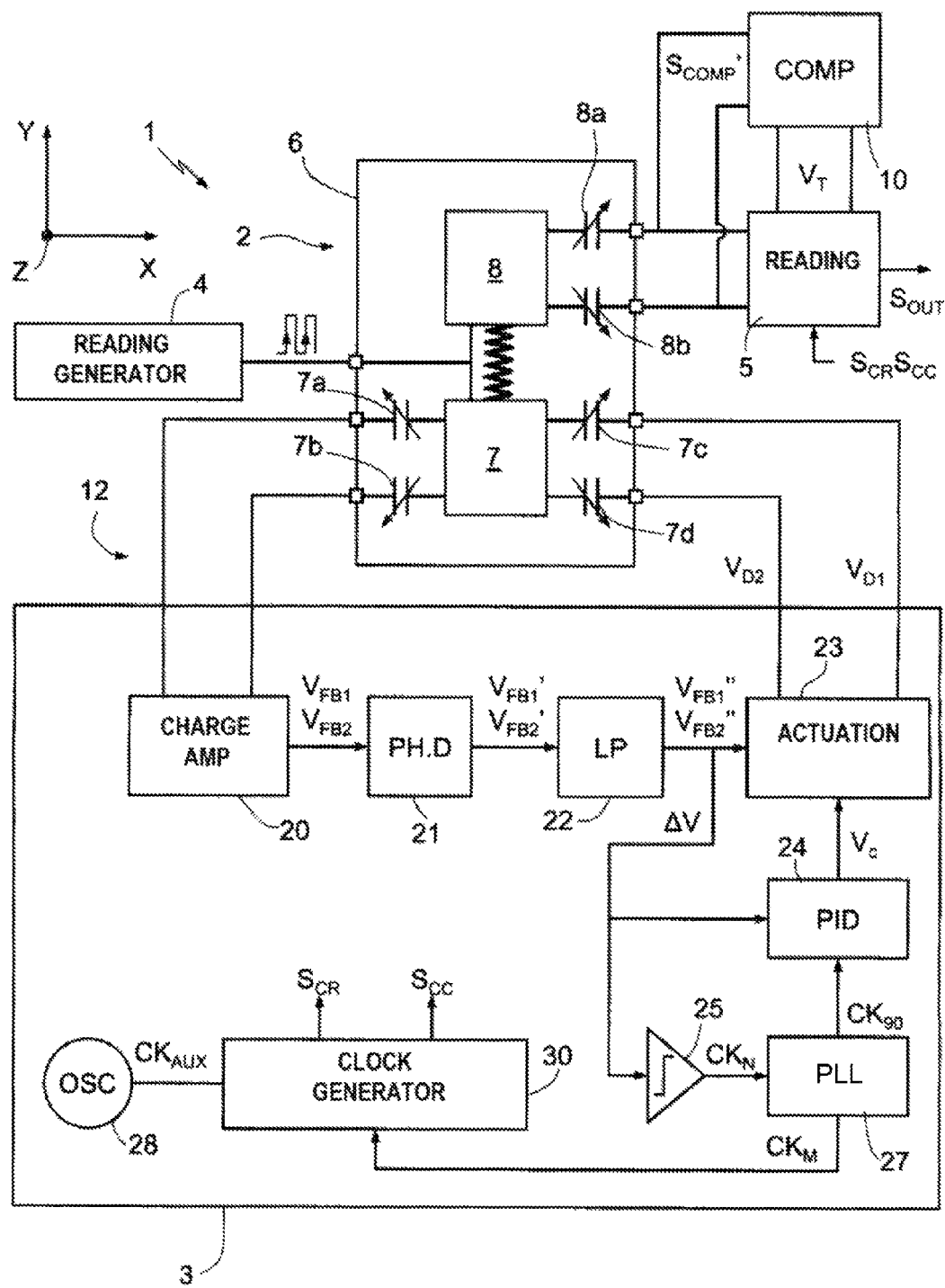
FIG. 1 is a simplified block diagram of a microelectromechanical gyroscope in accordance with one embodiment of the present disclosure.

FIG. 1 shows as a whole a microelectromechanical gyroscope 1, which comprises a microstructure 2, made of semiconductor material, a driving device 3, a reading generator 4, a reading device 5, and a compensation device 10.

The microstructure 2 is made of semiconductor material and comprises a supporting body 6, a driving mass 7, and at least one sensing mass 8. For reasons of simplicity, in the embodiment illustrated herein reference will be made to the case of a uniaxial gyroscope, in which only one sensing mass 8 is present. What is described applies, however, also in the case of multiaxial gyroscopes, which comprise two or more sensing masses or systems of sensing masses, for detecting rotations according to respective independent axes.

The driving mass 7 is elastically constrained to the supporting body 6 so as to be able to oscillate about a rest position according to one translational or rotational degree of freedom.

With reference to the movements of the driving mass 7 and of the sensing mass 8, the expressions "according to a degree of freedom" and "in accordance with a degree of freedom" will be used indifferently to indicate translational or rotational movements, as allowed by the degree of freedom itself. Likewise, the expressions "according to one axis" and "according to an axis" will be used indifferently to indicate movements along an axis or about an axis, according to whether the movements allowed for the masses by the respective degrees of freedom are translational (along an axis) or else rotational (about an axis), respectively.

The sensing mass 8 is mechanically coupled to the driving mass 7 so as to be driven in motion according to the degree of freedom of the driving mass 7 itself. Moreover, the sensing mass 8 is elastically connected to the driving mass 7 so as to oscillate in turn with respect to the driving mass 7 itself, with a respective further degree of freedom. In the embodiment described herein, in particular, the driving mass 7 is linearly movable along a driving axis X, whereas the sensing mass 8 is movable with respect to the driving mass 7 according to a sensing axis Y perpendicular to the driving axis X. It is understood, however, that the type of movement (translational or rotational) allowed by the degrees of freedom and the arrangement of the driving and detection axes may vary according to the type of gyroscope.

Moreover, the driving mass 7 (with the sensing mass 8) is connected to the supporting body 6 so as to define a resonant mechanical system with a resonance frequency $\omega_R$ (according to the driving axis X).

The driving mass 7 and the sensing mass 8 are capacitively coupled to the supporting body 6, respectively, through first and second sets of driving electrodes, which form first driving capacitors 7a, 7b and second driving capacitors 7c, 7d, and through sets of sensing electrodes, which form detection capacitors 8a, 8b. In particular, the detection capacitors 8a, 8b are configured in such a way that their capacitances depend in a differential way upon the position of the sensing mass 8 with respect to the fixed body 6 according to the sensing axis Y.

The driving device 3 is connected to the first driving capacitors 7a, 7b and to the second driving capacitors 7c, 7d so as to form, with the driving mass 7, an oscillating microelectromechanical loop 12, configured to keep the driving mass 7 (and the sensing mass 8 connected thereto) in oscillation at the resonance frequency $\omega_R$ with a controlled amplitude. In one embodiment, the driving device 3 comprises a charge amplifier 20, a phase-shift module 21, a low-pass filter 22, an actuation stage 23, a controller 24, a comparator 25, and a phase-lock loop (PLL) circuit 27. Moreover, an oscillator 28 and a clock generator 30, controlled by the PLL circuit 27, are used to supply clock signals for the driving device 3, for the reading generator 4, and for the reading device 5.

In one embodiment, the microelectromechanical loop 12 is of a hybrid type. The charge amplifier 20 is in fact of the switched-capacitor type and is configured to operate in a discrete-time way, whereas the low-pass filter 22 and the actuation stage 23 operate in a continuous-time way. The phase-shift module 21 performs conversion from discrete time to continuous time.

The components of the driving device 3 co-operate to control the amplitude of oscillation of the microelectromechanical loop 12, in particular the amplitude of oscillation of the driving mass 7 and to keep it close to a reference amplitude.

The charge amplifier 20, which is of a fully differential type and has inputs connected to the first driving capacitors 7a, 7b, defines a detection interface for detecting the position x of the driving mass 7 with respect to the driving axis X. The charge amplifier 20 receives feedback differential charge packets from the first driving capacitors 7a, 7b and converts them into feedback voltages $V_{FB1}$, $V_{FB2}$, indicating the position x of the driving mass 7. In this way, the charge amplifier 20 performs a discrete-time reading of the position x of the driving mass 7.

The phase-shift module 21 is cascaded to the charge amplifier 20 and introduces a phase shift as close as possible to 90°. In one embodiment, the phase-shift module 21 comprises a sample-and-hold circuit and is moreover configured to operate a first filtering of a low-pass type. Phase-shifted feedback voltages $V_{FB1}'$, $V_{FB2}'$ supplied by the phase-shift module 21 are hence delayed and attenuated with respect to the feedback voltages $V_{FB1}$, $V_{FB2}$.

The low-pass filter 22 is arranged downstream of the phase-shift module 21, is a second-order fully differential filter and supplies filtered feedback voltages $V_{FB1}''$, $V_{FB2}''$ that vary continuously in time. The cut-off frequency of the low-pass filter 22 is selected in such a way that the oscillation frequency of the microelectromechanical loop 12 (in particular, of the driving mass 7), hereinafter designated as driving frequency $\omega_D$, is included in the passband and in such a way that the phase of the useful signal indicating the position x of the driving mass 7 is not substantially altered. Moreover, the passband of the low-pass filter 22 is such that the undesirable signal components, linked to sampling by discrete-time reading, are attenuated by at least 30 dB.

The actuation stage 23 is of a continuous-time fully differential type and has a variable gain. Moreover, the actuation stage 23 is cascaded to the low-pass filter 22 and has outputs connected to the second driving capacitors 7c, 7d for supplying driving voltages $V_{D1}$, $V_{D2}$ such as to sustain the oscillation of the microelectromechanical loop 12 at the driving frequency $\omega_D$, which is close to the mechanical resonance frequency $\omega_R$ of the microstructure 2. For this purpose, the gain G of the actuation stage 23 is determined by the controller 24 by a control signal $V_C$ correlated to the filtered feedback voltages $V_{FB1}''$, $V_{FB2}''$ supplied by the low-pass filter 22. The controller 24 is, for example, a discrete-time proportional-integral-derivative (PID) controller. In particular, the gain G is determined so as to maintain the conditions of oscillation of the microelectromechanical loop 12.

The comparator 25 has inputs connected to the outputs of the low-pass filter 22 for receiving the difference voltage ΔV between the filtered feedback voltages $V_{FB1}''$, $V_{FB2}''$. The output of the comparator 25 switches at each zero-crossing of the difference voltage ΔV, operating as frequency-detector device.

The output of the comparator 25, which supplies a native clock signal $CK_N$, is connected to an input of the PLL circuit 27 so as to enable phase-locking with the microelectromechanical loop 12. The native clock signal $CK_N$ is, however, phase-shifted with respect to the movement of the driving mass, owing to the presence of the charge amplifier 20, the first phase-shift module 21, and the low-pass filter 22.

The PLL circuit 27 supplies a master clock signal $CK_M$ and a quadrature clock signal $CK_{90}$. The master clock signal $CK_M$ has a frequency equal to an integer multiple of the frequency of the native clock signal $CK_N$.

The quadrature clock signal $CK_{90}$ has the same frequency and is phase-shifted by 90° with respect to the master clock signal $CK_M$ and is used for timing the controller 24. In practice, the quadrature clock signal $CK_{90}$ switches at the maxima and at the minima of the filtered feedback voltages $V_{FB1}''$, $V_{FB2}''$ at output from the low-pass filter 22. The controller 24 is thus properly timed to sample the peak values of the difference voltage ΔV between the filtered feedback voltages $V_{FB1}''$, $V_{FB2}''$.

The oscillator 28 provides the clock generator 30 with an auxiliary clock signal $CK_{AUX}$ having a calibrated frequency, close to the driving frequency $\omega_D$ for controlling the oscillations of the driving mass 7 when the PLL circuit 27 is not locked (for example, in the start-up transients).

The clock generator 30 receives the master clock signal $CK_M$ and the auxiliary clock signal $CK_{AUX}$ and uses them to generate the clock signals necessary for the discrete-time components and, more in general, for proper operation of the gyroscope 1. The auxiliary clock signal is used when the PLL circuit 27 is not synchronized with the oscillations of the microelectromechanical loop 12 and hence the master clock signal $CK_M$ is not available, such as for example during steps of start-up or during steps of resumption following upon shock. The master clock signal $CK_M$ is used when the oscillations of the microelectromechanical loop 12 are stabilized at the driving frequency $\omega_D$.

In one embodiment, the clock generator 30 also supplies a reading conversion signal $S_{CR}$ and a sinusoidal compensation conversion signal $S_{cc}$ at the driving frequency $\omega_D$, which are, respectively, in phase and in quadrature with respect to the velocity of oscillation of the driving mass 7 and of the sensing mass 8 according to the driving axis X (in particular, "quadrature" denotes a phase shift of 90°+k360° or 270°+k360°, k being an integer). In an alternative embodiment, the reading conversion signal $S_{CR}$ and the compensation conversion signal $S_{cc}$ are generated internally by the compensation device 10 starting from a clock signal of the microelectromechanical loop 12, for example, the master clock signal $CK_M$ or the quadrature clock signal $CK_{90}$.

The reading device 5 is of the discrete-time open-loop type and, in the embodiment described herein, is configured to carry out a so-called "double-ended" reading of the displacements of the sensing mass 8 according to the respective degree of freedom (in particular, for detecting a position of the sensing mass along the sensing axis Y) and to convert the displacements detected into an output signal $S_{OUT}$, indicating the angular speed Ω of the microstructure 2. For this purpose, the reading device 5 has inputs connected to the detection capacitors 8a, 8b and an output 5a, supplying the output signal $S_{OUT}$.

Figure 2:
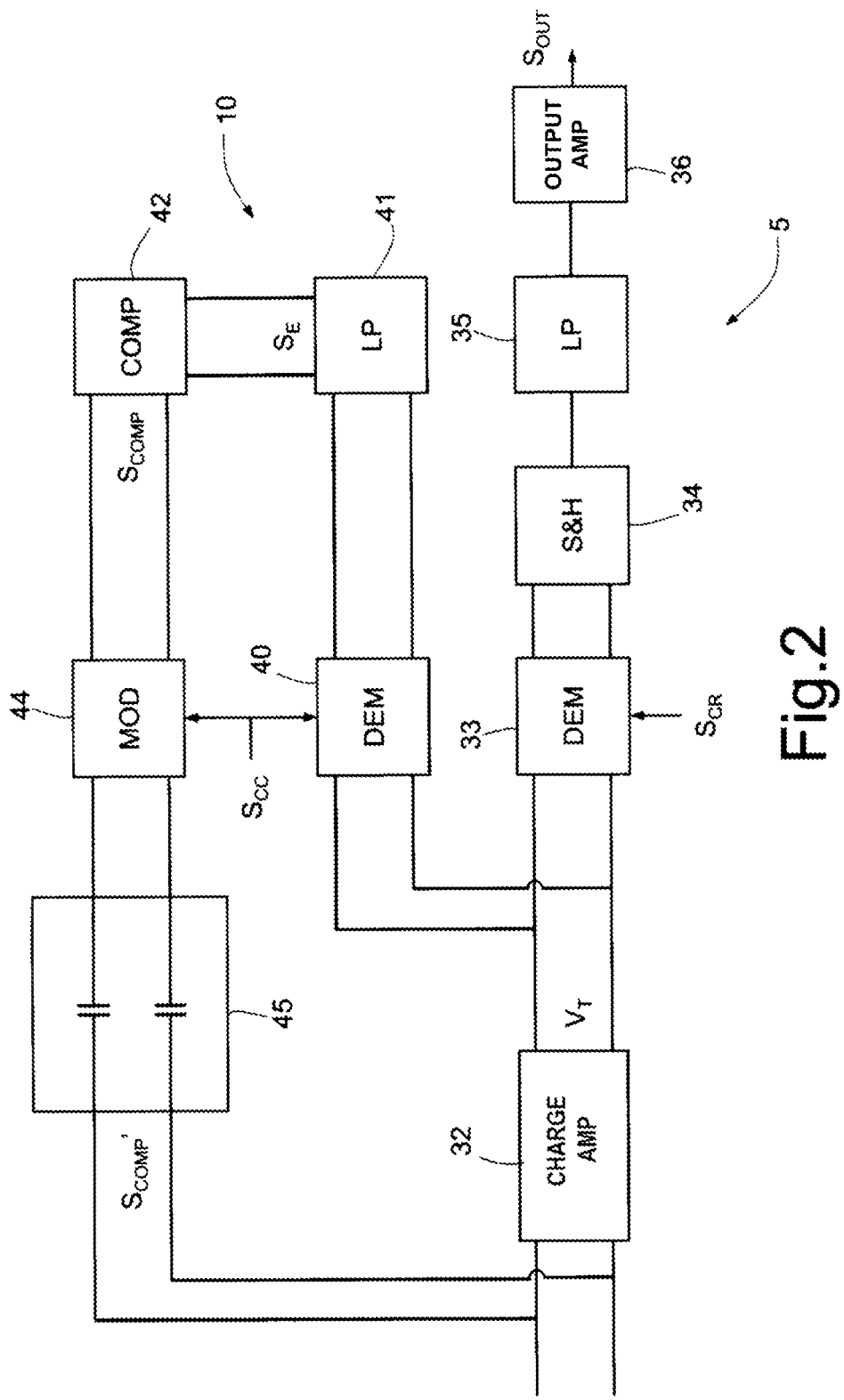
FIG. 2 is a more detailed block diagram of the microelectromechanical gyroscope of FIG. 1.

As illustrated in FIG. 2, in one embodiment the reading device 5 comprises a reading charge amplifier 32, a demodulator 33, a sample-and-hold (S&H) stage 34, a low-pass filter 35, and an output amplifier 36, cascaded to one another. The reading amplifier 32 and the demodulator 33 are of the fully differential switched-capacitor type.

The reading amplifier 32 supplies a transduction signal $V_T$, which is correlated, in particular proportional, to the variations of the capacitive coupling (capacitance of the detection capacitors 8a, 8b) between the sensing mass 7 and the supporting body 6 in response to the Coriolis force caused by rotations of the supporting body 6 about a gyroscopic axis Z perpendicular to the driving axis X and to the sensing axis Y. In practice, the transduction signal $V_T$ represents the position of the sensing mass 8 according to the sensing axis Y with respect to a position of equilibrium. The transduction signal $V_T$ presents as the combination of a carrier signal, at the driving frequency $\omega_D$ and in phase with the velocity of oscillation of the driving mass 7 and of the sensing mass 8 in accordance with the driving axis X, and of a modulating signal, determined by the instantaneous angular speed of the supporting body 6 about the gyroscopic axis Z. Moreover, in the transduction signal $V_T$ there may be present quadrature components, which are in phase with respect to the position and phase-shifted by 90° (or rather, by 90°+k360° or else by 270°+k360°) with respect to the velocity of the driving mass 7 and of the sensing mass 8 according to the driving axis X.

In practice, the reading amplifier 32 converts the variations of the capacitive coupling between the sensing mass 7 and the supporting body 6 into an electrical signal indicating the angular speed of the supporting body 6 about the gyroscopic axis Z. In one embodiment, the reading amplifier 32 is a charge-to-voltage converter.

The demodulator 33 is coupled to the reading amplifier 32 for receiving the transduction signal $V_T$ and uses the sinusoidal reading conversion signal $S_{CR}$ for demodulating the transduction signal $V_T$. The reading conversion signal $S_{CR}$, which is supplied by the microelectromechanical loop 12, has the driving frequency $\omega_D$ and is in phase with the velocity of oscillation of the driving mass 7 and of the sensing mass 8 along the driving axis X.

The compensation device 10 comprises a demodulator 40, a low-pass filter 41, a control stage 42, a modulator 44, and a capacitive coupling stage 45, which are connected to the reading amplifier so as to form a feedback control loop that suppresses or at least attenuates the quadrature components present in the transduction signal $V_T$ (i.e., the components with a phase shift of 90°+k360° or of 270°+k360° with respect to the synchronous carrier signal at the velocity of oscillation of the driving mass 7 and of the sensing mass 8 according to the driving axis X).

The demodulator 40 is coupled to the charge amplifier for receiving the transduction signal $V_T$ and uses a sinusoidal compensation conversion signal $S_{CC}$ for demodulating the transduction signal $V_T$. The compensation conversion signal $S_{CC}$ has the driving frequency $\omega_D$ and is in quadrature with respect to the reading conversion signal $S_{CR}$ and to the velocity of oscillation of the driving mass 7e and of the sensing mass 8 according to the driving axis X.

The low-pass filter 41 is cascaded to the demodulator 40 and is configured to suppress the signal components at frequency $2\omega_M$ deriving from the demodulation. As a result of demodulation and filtering, the low-pass filter 41 supplies an error signal $S_E$ that substantially represents only the quadrature components present in the transduction signal $V_T$.

The control stage 42 is configured to eliminate or at least attenuate the quadrature components present in the transduction signal $V_T$. In particular, the control stage 42 is cascaded to the low-pass filter 41 for receiving the error signal $S_E$ and supplies a compensation signal $S_{COMP}$ that, modulated by the modulator 44 and applied to the inputs of the reading amplifier 32 through the capacitive coupling stage 45 ($S_{COMP'}$), tends to suppress or at least reduce the error signal $S_E$, which, as mentioned previously, represents the quadrature components present in the transduction signal $V_T$. For example, the control stage 42 may be a PI or PID controller.

The modulator 44 is cascaded to the control stage 42 and uses the compensation conversion signal $S_{CC}$ for modulating the compensation signal $S_{COMP}$, before applying it to the inputs of the reading amplifier 32 through the capacitive coupling stage 45.

The compensation device 10 and the reading amplifier 32 form a feedback control loop that, by eliminating or reducing the error signal $S_E$, tends to suppress or reduce the spurious quadrature components present in the transduction signal $V_T$. The effect is obtained thanks to the injection or removal of charge at the inputs of the reading amplifier 32, caused by the compensation signal $S_{COMP}$, which is generated by the control stage 42, modulated by the modulator 44, and applied through the capacitive coupling stage 45. Since the modulator 44 uses the compensation conversion signal $S_{CC}$, demodulation and modulation of the signals in the control loop is carried out in phase. As a consequence of suppression of the quadrature components in the transduction signal $V_T$, also the output signal $S_{OUT}$ is cleaned up of the spurious components.

The compensation device described also presents the advantage of obtaining suppression of the spurious components through a feedback control structure. As compared to open-loop systems, it is hence more robust, in particular as regards errors due to process spread, to imperfect calibration, and to drifts caused by ageing of the components.

Figure 3:
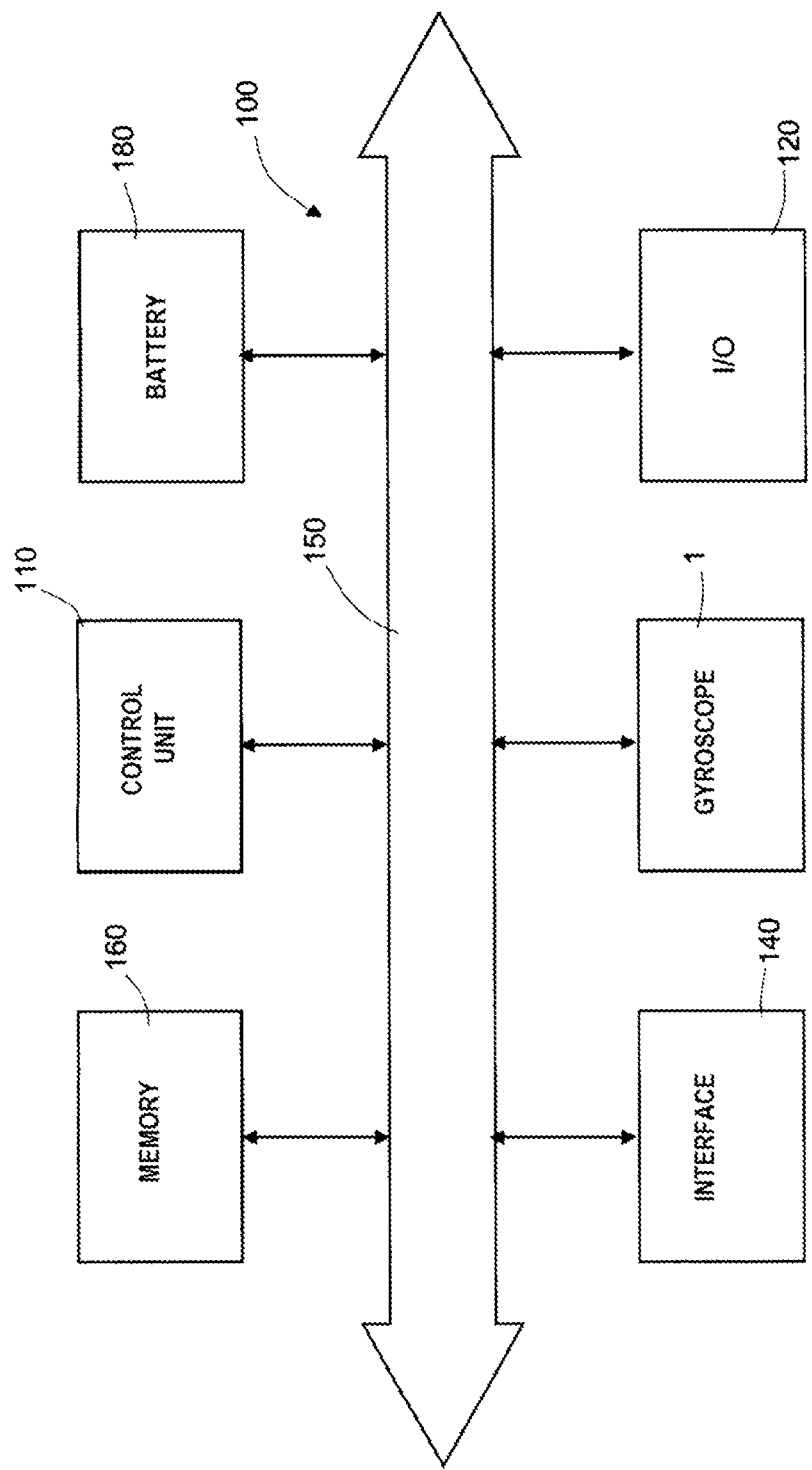
FIG. 3 is a simplified block diagram of an electronic system incorporating a microelectromechanical gyroscope according to one embodiment of the present disclosure.

FIG. 3 illustrates a portion of an electronic system 100 in accordance with one embodiment of the present disclosure. The system 100 incorporates the gyroscope 1 and may be used in devices, such as, for example, a palmtop computer (personal digital assistant, PDA), a laptop or portable computer, possibly with wireless capacity, a cellphone, a messaging device, a digital music player, a digital camera or other devices designed to process, store, transmit, or receive information. For example, the microelectromechanical device 1 may be used in a digital camera for detecting movements and performing image stabilization. In a further embodiment, the microelectromechanical device 1 is included in a motion-activated user interface activated for computers or consoles for videogames. In a further embodiment, the microelectromechanical device 1 is incorporated in a satellite navigation device and is used for temporary tracking of position in the case of loss of the satellite-positioning signal. The electronic system 100 may comprise a controller 110, an input/output (I/O) device 120 (for example, a keyboard or a display), the microelectromechanical device 1, a wireless interface 140, and a memory 160, of a volatile or non-volatile type, coupled together through a bus 150. In one embodiment, a battery 180 may be used for supplying the system 100. It should be noted that the scope of the present disclosure is not limited to embodiments necessarily having one or all the devices listed.

The controller 110 may comprise, for example, one or more microprocessors, microcontrollers, and the like.

The I/O device 120 may be used to generate a message. The system 100 may use the wireless interface 140 to transmit and receive messages to and from a wireless communication network with a radiofrequency (RF) signal. Examples of wireless interface may comprise an antenna, a wireless transceiver, such as a dipole antenna, even though the scope of the present disclosure is not limited from this standpoint. Moreover, the I/O device 120 may supply a voltage representing what is stored either in the form of digital output (if digital information has been stored) or in the form analog output (if analog information has been stored).

Modifications and variations may be made to the microelectromechanical device and to the method described herein, without thereby departing from the scope of the present disclosure.

In particular, the microelectromechanical device may incorporate one or more microelectromechanical sensors of any type, but also micromotors and microactuators.

Grouping and driving of the switches of the selection module may vary and is basically determined by the mode of operation of the sensors, micromotors, or microactuators incorporated in the device.

Modifications and variations may be made to the gyroscope described herein, without departing from the scope of the present disclosure.

Closed-loop compensation may be used in gyroscopes of any type, whether uniaxial or multiaxial. In particular, driving may be carried out either with discrete-time microelectromechanical loops or with continuous-time microelectromechanical loops and may exploit translational or rotational degrees of freedom. The detection device that reads the displacements of the sensing mass and extracts the angular speed may also be of discrete-time type or of a continuous-time type. Furthermore, the reading device may be of the open-loop type, as in the example described, or else may exploit a feedback loop for applying force on the sensing mass. Reading may be differential of a "double-ended" type or else of a "single-ended" type.

The compensation device described may advantageously be applied also in gyroscopes that use a single mass (or a system of movable masses coupled in phase opposition) with a number of degrees of freedom, where the mass (each mass) is used both for driving and detection. In this case, the mass is equipped both with driving electrodes and with sensing electrodes.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
a supporting body;
a sensing mass elastically coupled to the supporting body and movable with respect to the supporting body according to a driving axis and a sensing axis;
a driving device coupled to the sensing mass by a microelectromechanical driving loop operable to generate a driving signal and to maintain the sensing mass in oscillation according to the driving axis at a driving frequency based on the driving signal, the driving device including a clock generator that generates and outputs a compensation conversion signal and a reading conversion signal, each of the driving signal, the compensation conversion signal, and the reading conversion signal separate signals output by the driving device;
a reading device coupled to the sensing mass and configured to provide an output signal representative of an angular speed of the supporting body, the reading device including a reading amplifier configured to provide a transduction signal representative of a position of the sensing mass according to the sensing axis; and
a compensation device configured to reduce spurious signal components in quadrature with respect to a velocity of oscillation of the sensing mass according to the driving axis, the compensation device being configured to form a feedback control loop with the reading amplifier and configured to extract, from the transduction signal, an error signal representative of quadrature components in the transduction signal and configured to provide the reading amplifier with a compensation signal that is a function of the error signal and is configured to reduce the quadrature components in the transduction signal,
wherein the compensation device includes a compensation demodulator coupled to the clock generator and configured to receive the compensation conversion signal and demodulate the transduction signal based on the compensation conversion signal, in quadrature with respect to the velocity of oscillation of the sensing mass according to the driving axis, a compensation low-pass filter cascaded to the compensation demodulator and configured to suppress signal components at twice the frequency of the driving frequency, a control stage coupled to the low-pass filter, and a compensation modulator coupled to the control stage and to the clock generator, the compensation modulator being configured to receive the compensation conversion signal and to modulate an output of the control stage based on the compensation conversion signal.

2. The gyroscope according to claim 1 wherein the microelectromechanical driving loop is configured to provide the compensation demodulator with the compensation conversion signal in quadrature with respect to the velocity of oscillation of the sensing mass.

3. The gyroscope according to claim 1, wherein the compensation low-pass filter is configured to provide the error signal.

4. The gyroscope according to claim 1 wherein the compensation modulator is configured to modulate the compensation signal in quadrature with respect to the velocity of oscillation of the sensing mass.

5. The gyroscope according to claim 4 wherein the compensation device is coupled to the microelectromechanical driving loop and is configured to obtain the compensation conversion signal in quadrature with respect to the velocity of oscillation of the sensing mass.

6. The gyroscope according to claim 5 wherein the compensation demodulator and the compensation modulator are configured to use the compensation conversion signal to demodulate the transduction signal and to modulate the compensation signal, respectively.

7. The gyroscope according to claim 1 wherein the control stage is configured to provide the compensation signal as a function of the error signal.

8. The gyroscope according to claim 7 wherein the control stage includes a proportional-integral-derivative controller.

9. The gyroscope according to claim 7, comprising a capacitive coupling stage between the control stage and the reading amplifier.

10. The gyroscope according to claim 1 wherein the reading device includes a reading demodulator cascaded to the reading amplifier and configured to demodulate the transduction signal in phase with respect to the velocity of oscillation of the sensing mass.

11. A system, comprising:
a control unit; and
a microelectromechanical gyroscope coupled to the control unit, the gyroscope including:
a driving assembly including a clock generator configured to generate and output a compensation conversion signal, a reading conversion signal, and a driving signal, each of the compensation conversion signal, the reading conversion signal, and the driving signal are separate signals output by the driving assembly;
a sensing mass configured to be driven by the driving signal in oscillation by the driving assembly along a driving axis, the driving assembly and the sensing mass configured to form a driving loop configured to maintain the sensing mass in oscillation along the driving axis at a driving frequency;

a reading assembly coupled to the sensing mass and configured to provide an output signal that represents an angular speed of the system, the reading assembly including:
- a reading amplifier configured to provide a transduction signal representative of a position of the sensing mass with respect to a sensing axis; and
- a compensation device coupled to the reading amplifier and configured to form a feedback control loop that extracts, from the transduction signal, an error signal representative of quadrature components in the transduction signal and provides the reading amplifier with a compensation signal that is a function of the error signal, the compensation device reduces the quadrature components in the transduction signal,
- wherein the compensation device includes a compensation demodulator coupled to outputs of the reading amplifier and to the clock generator, the compensation demodulator being configured to receive the compensation conversion signal and demodulate the transduction signal based on the compensation conversion signal, in quadrature with respect to the velocity of oscillation of the sensing mass according to the driving axis, a compensation low-pass filter cascaded to the compensation demodulator and configured to suppress signal components at twice the frequency of the driving frequency, a control stage coupled to the low-pass filter, and a compensation modulator coupled to the control stage and to the clock generator, the compensation modulator being configured to receive the compensation conversion signal and to modulate an output of the control stage based on the compensation conversion signal.

12. The system of claim 11 wherein the reading amplifier is coupled to outputs of the sensing mass and outputs of the compensation device are coupled to the outputs of the sensing mass.

13. A method, comprising:
controlling a microelectromechanical gyroscope having a supporting body and a sensing mass, elastically coupled to the supporting body and movable with respect to the supporting body according to a driving axis and a sensing axis, the controlling including:
- generating, by a clock generator in a driving device, a compensation conversion signal and a reading conversion signal;
- generating, by the driving device, a driving signal, each of the compensation conversion signal, the reading conversion signal, and the driving signal being separate signal;
- oscillating the sensing mass according to the driving axis with a driving frequency based on the driving signal;
- providing an output signal representative of an angular speed of the supporting body by providing, by a reading amplifier, a transduction signal representative of a position of the sensing mass according to the sensing axis;
- reducing spurious signal components in quadrature with respect to a velocity of oscillation of the sensing mass according to the driving axis by:
    - extracting, from the transduction signal, an error signal representative of quadrature components in the transduction signal by demodulating the transduction signal, based on the compensation conversion signal, in quadrature with respect to the velocity of oscillation of the sensing mass according to the driving axis and suppressing signal components at twice the frequency of the driving frequency;
    - generating, by a control stage, a compensation signal based on the error signal;
    - modulating the compensation signal based on the compensation conversion signal to generate a modulated compensation signal; and
    - providing the modulated compensation signal as feedback to the reading amplifier to reduce the quadrature components in the transduction signal.

14. The method according to claim 13 wherein modulating the compensation signal includes modulating the compensation signal in quadrature with respect to the velocity of oscillation of the sensing mass.

15. The method according to claim 13, further comprising demodulating the transduction signal based on the reading conversion signal.

16. The method according to claim 13 further comprising:
generating, by an oscillator coupled to the clock generator, an auxiliary clock signal having a calibrated frequency substantially equal to the driving frequency, wherein generating the compensation conversion signal and the reading conversion signal includes generating the compensation conversion signal and the reading conversion signal based on the auxiliary clock signal.

17. The microelectromechanical gyroscope according to claim 1 wherein the driving device includes an oscillator coupled to the clock generator, the clock generator being configured to generate the compensation conversion signal and the reading conversion signal based on an output of the oscillator.

18. The microelectromechanical gyroscope according to claim 1 wherein the clock generator is configured to generate the compensation conversion signal and the reading conversion signal at the driving frequency.

19. The system according to claim 11 wherein the driving device includes an oscillator coupled to the clock generator, the clock generator being configured to generate the compensation conversion signal and the reading conversion signal based on an output of the oscillator.

20. The system according to claim 11 wherein the clock generator is configured to generate the compensation conversion signal and the reading conversion signal at the driving frequency.

* * * * *